United States Patent [19]

Takahashi

[11] Patent Number: 5,612,942
[45] Date of Patent: Mar. 18, 1997

[54] OPTICAL HEAD

[75] Inventor: Jun-ichi Takahashi, Tokyo, Japan

[73] Assignee: NEC Corporation, Japan

[21] Appl. No.: 342,610

[22] Filed: Nov. 21, 1994

[30] Foreign Application Priority Data

Nov. 19, 1993 [JP] Japan .................................. 5-314107
Dec. 28, 1993 [JP] Japan .................................. 5-336202

[51] Int. Cl.$^6$ .................................................. G11B 7/00
[52] U.S. Cl. ........................ 369/112; 369/107; 369/109; 369/116; 369/100
[58] Field of Search ................... 369/107, 109, 369/112, 116, 118, 120, 121, 44.41, 44.14, 100

[56] References Cited

U.S. PATENT DOCUMENTS

| | | | |
|---|---|---|---|
| 4,868,807 | 9/1989 | Okada et al. | 369/109 |
| 5,010,541 | 4/1991 | Takeuchi | 369/107 |
| 5,122,903 | 6/1992 | Aoyama et al. | 369/109 |
| 5,172,369 | 12/1992 | Chikuma et al. | 369/112 |
| 5,245,596 | 9/1993 | Gupta et al. | 369/44.14 |
| 5,247,510 | 9/1993 | Lee et al. | 369/118 |
| 5,313,441 | 5/1994 | Imai et al. | 369/44.14 |
| 5,349,592 | 9/1994 | Andó | 369/112 |
| 5,434,840 | 7/1995 | Ezuka et al. | 369/100 |

FOREIGN PATENT DOCUMENTS

| | | |
|---|---|---|
| 2-12623 | 1/1990 | Japan . |
| 2-12624 | 1/1990 | Japan . |

*Primary Examiner*—Loha Ben
*Attorney, Agent, or Firm*—Ostrolenk, Faber, Gerb & Soffen, LLP

[57] ABSTRACT

A light radiated from a light source is focused to provide a light spot on an optical disc. A central portion of the radiated light is shielded, and a peripheral portion of the radiated light is modulated to have an intensity decreasing in an outer periphery direction, respectively, by a light intensity modulator. Consequently, a diameter of the light spot is reduced, and side-lobes are suppressed. In place of the light intensity modulator, a light source filter and a second filter are used. A secondary light source is formed by focusing the radiated light. At a point of the secondary light source, the light source filter having a central portion of 0% and a peripheral portion of 100%, respectively, in light transmission intensity is provided. On an output side of a collimator lens, the second filter having central portion of 100% and a peripheral portion of 0%, respectively, in light transmission intensity is provided.

9 Claims, 11 Drawing Sheets

42a CENTRAL PORTION
42b PERIPHERAL PORTION

FIG.4B(b)

PHASE SHIFT: π, 0

FIG.4A(a)

41a CENTRAL PORTION
41b PERIPHERAL PORTION

FIG.4A(b)

LIGHT TRANSMISSION INTENSITY (%): 100, 0

VARIOUS PUPIL FUNCTIONS FOR CIRCULAR APERTURE

FIG.8B

TRANSFER FUNCTION FOR SLIT APERTURE

OPTICAL HEAD

FIELD OF THE INVENTION

The invention relates to an optical head, and more particularly to, the improvement of a signal to noise ratio of information reproduced from an optical disc in an optical head.

BACKGROUND OF THE INVENTION

A first conventional optical head comprises an optical system in which a light spot is formed on an optical disc, and a light reflected from the optical disc is splitted to two lights, the first one of which is supplied to a first photodetector, and the second one of which is supplied via a cylindrical lens to a second photodetector, so that a tracking error is detected in the first photodetector by push-pull method, and a focusing error is detected in the second photodetector by astigmatism generated by the cylindrical lens.

In the first conventional optical head, the light spot is required to be small for high density recordation and reproduction of information. For this reason, a wavelength of a light radiated from a semiconductor laser is made small, and a numerical aperture NA of an objective lens for forming a light spot on the optical disc is made large.

In this first conventional optical head, however, there is a limitation to make a diameter of the light spot small. Especially, it is difficult for the light spot to be smaller than a diffraction limitation.

In order to make the diameter of the light spot smaller than the diffraction limitation, a second conventional optical head comprising a light shielding plate for shielding a central portion of a light beam radiated from a semiconductor laser as explained in the Japanese Patent Kokai Nos. 2-12623 and 2-12624.

In the second conventional optical head, however, there is a disadvantage in that side-lobes are generated to detect signals from adjacent pits, thereby generating noise to make it impossible in the worst case that high density recordation of information into and reproduction thereof from an optical disc is practically carried out.

SUMMARY OF THE INVENTION

Accordingly, it is an object of the invention to provide an optical head in which a diameter of a light spot formed on an optical head is smaller than a diffraction limitation for high density recordation and reproduction, while side-lobes are suppressed to increase a signal to noise ratio of the reproduced information.

It is a further object of the invention to provide an optical head in which the diameter reduction of a light spot formed on an optical disc is realized without dependency on a wavelength of a light beam and a numerical aperture on an objective lens.

According to the invention, an optical head, comprises:

a light source for providing a radiated light beam;

a collimator lens for collimating the radiated light beam to provide a collimated light;

an objective lens for focusing the collimated light to form a light spot on an optical disc;

a beam splitter for splitting a light beam reflected from the optical disc to first and second light beams;

means for converting the first and second light beams to first and second electric signals;

a light source filter for converting an intensity distribution of the radiated light beams to an intensity distribution of a disc having a circular aperture to provide an intensity distribution-converted light which is supplied to the collimator lens as the radiated light beam; and a second filter for converting an intensity distribution of the intensity distribution of the distribution-converted light dependently on the intensity distribution-converted light, the second filter being positioned at an output stage of the collimator.

BRIEF DESCRIPTION OF THE DRAWINGS

The invention will be explained in more detail in conjunction with appended drawings, wherein:

FIGS. 4A(a) and (b) to FIGS. 4E(a) and (b) are explanatory diagrams showing optical filters used in the first preferred embodiment, and transmission intensities and phase shifts of the optical filters;

FIGS. 5A(a) and (b) to FIGS. 5E(a) and (b) are explanatory diagrams showing optical filters used in the first preferred embodiment, and transmission intensities and phase shifts of the optical filters;

FIGS. 7A(a) and (b) to FIGS. 7D(a) and (b) are explanatory diagrams showing light intensity modulators used in the second preferred embodiment according to the invention, and transmission intensities an phase shifts of the light intensity modulators.

DESCRIPTION OF THE PREFERRED EMBODIMENTS

Before explaining an optical head in a preferred embodiment according to the invention, the aforementioned first and second conventional optical heads will be explained in FIGS. 1 and 2.

Figure 1:
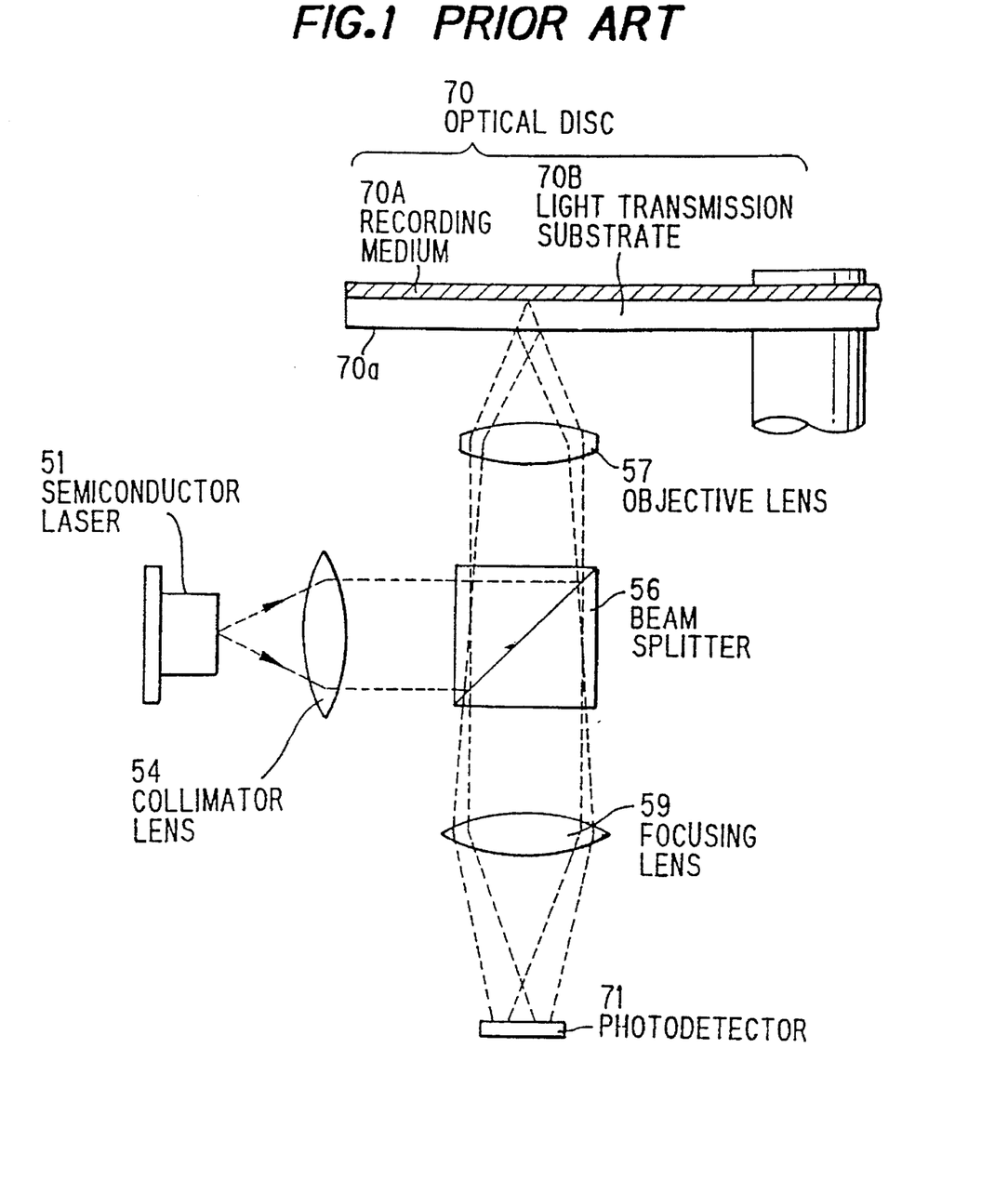
FIG. 1 is an explanatory diagram showing a first conventional optical head.

FIG. 1 shows the first conventional optical head which comprises a semiconductor laser 51, a collimator lens 54, a beam splitter 56, an objective lens 57, a focusing lens 59, a photodetector 61, and a disc 70 comprising an optical recording medium 70A and a light transmission substrate 70B having a disc surface 70a.

In operation, a light radiated from the semiconductor laser 1 is focused via the collimator lens 54 and the beam splitter 56 on a signal surface of the optical recording medium 70A of the disc 70 by the objective lens 57. A light reflected from the signal surface of the disc 70 is supplied via the objective lens 57, the beam splitter 56, and the focusing lens 59 to a light receiving surface of the photodetector 71 in which the received light is converted to an electric signal.

In such an optical information reproducing apparatus, the increase of recording capacity is always desired. For this reason, a light spot formed on the signal surface of the disc 70 is required to be as small as possible for high density-recordation.

In general, the size of a fine light spot on a recording medium depends on a wavelength of a laser light and a numerical aperture NA of an objective lens. Therefore, the wavelength is made small, and the numerical aperture NA of the objective lens is made large, so that the light spot size is small on the signal surface of the disc.

On the other hand, the Japanese Patent Kokai Nos. 2-12623 and 2-12624 disclose optical heads in which a fine light spot smaller than a limitation of diffraction is formed by shielding a central portion of a light beam radiated from a laser light source.

Figure 2:
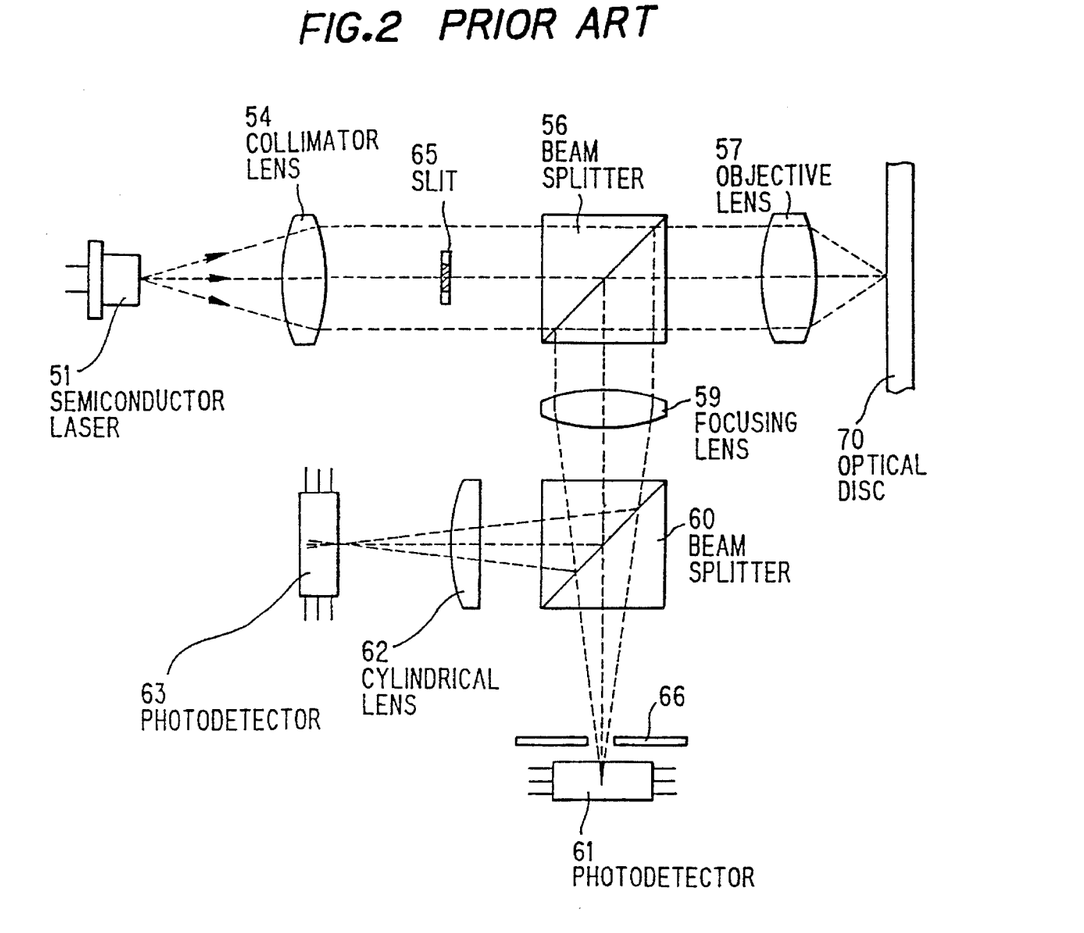
FIG. 2 is an explanatory diagram showing a second conventional optical head.

FIG. 2 shows this kind of an optical head which is referred to as a second conventional optical head. It comprises a semiconductor laser 51, a collimator lens 54, a beam splitter 56, an objective lens 57, a focusing lens 59, a beam splitter 60, a photoelectric converter 61, a cylindrical lens 62, a photoelectric converter 63, a light shielding plate 65, a slit 66, and a disc 70.

In operation, a light radiated from the semiconductor laser 51 is converted to a collimated light by the collimator lens 54, and a central portion of the collimated light is shielded by the shielding plate 65. The light of non-shielded portion is focused via the beam splitter 56 on the disc 70 by the focusing lens 57. The focused light spot is a fine light spot which is smaller than the diffraction limitation, because the central portion of the collimated light is shielded by the shielding plate 65, and the central portion-excluded light is focused on the disc 70.

Then, the light reflected to be modulated by the disc 70 is again collimated by the focusing lens 57, and the collimated light is introduced to an optical signal detection system by the beam splitter 56. The introduced light is split into two light paths by the beam splitter 60, and one of the lights is supplied via the slit 66 to the photoelectric converter 61, while the remaining one of the lights is supplied via the cylindrical lens 62 to the photoelectric converter 63. Consequently, a focusing error is detected in the photoelectric converter 63 in accordance with astigmatism generated by a tracking error detected in the photoelectric converter 61 by a push-pull method.

In the detection of the tracking error, the slit 66 is provided to remove side-lobes (diffraction rings) generated by the light shielding plate 65 and the objective lens 57, wherein the side-lobes result that cross-talk from adjacent pits of the disc 70 is mixed into a signal light to deteriorate a reproduced signal as noise.

When the size of a light spot is mode small for high density recordation, however, the removal of side-lobes, that is, the reduction of noise is not sufficiently realized in the second conventional optical head.

Next, an optical head in the first preferred embodiment according to the invention will be explained.

Figure 3:
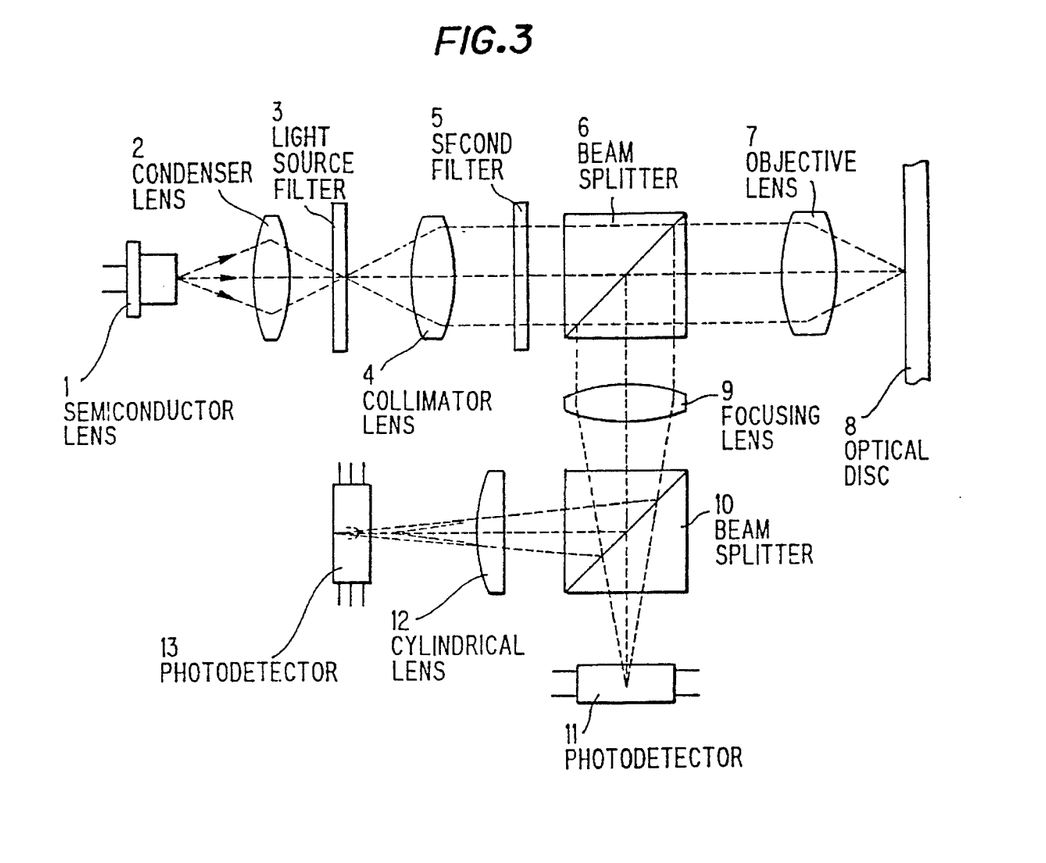
FIG. 3 is an explanatory diagram showing an optical head in a first preferred embodiment according to the invention.

The optical head comprises a semiconductor laser 1, a condenser lens 2, a light source filter 3, a collimator lens 4, a second filter 5, a beam splitter 6, an objective lens 7, an optical disc 8, a focusing lens 9, a beam splitter 10, a photoelectric converter 11, a cylindrical lens 12, and a photoelectric converter 13.

In this optical head, the condenser lens 2 forms a secondary light source, at which the light source filter 3 is positioned. The light source filter 3 converts an intensity distribution of a laser light focused on the light source filter 3 to an intensity distribution of a disc having an ordinary circular opening. In other words, the light source filter 3 is characterized in that an intensity distribution of the secondary light source is set to be an intensity distribution O' (u,v) in which the change of side-lobes of an image can be suppressed in an optical system, and an intensity distribution I' (x,y) on an image plane of a laser light including detected information is represented by the equation (1) for a focused image in the optical system, $$I'(x,y)=\iint O'(u,v) \cdot D'(x-u, y-v) \, du \, dv \quad (1)$$

where D' (x−u, y−v) is an impulse response, and O' (u,v) is an intensity distribution of the secondary light source.

In operation, a light radiated from the semiconductor laser 1 is focused on the light source filter 3 for the secondary light source. The light, an intensity distribution of which is converted by the light source filter 3, is collimated by the collimator lens 4, and the collimated light is transmitted through the second filter 5 to be converted in intensity distribution for the second time. Then, the second filter-transmitted light is transmitted through the beam splitter to be supplied to the objective lens 7. Thus, a light spot is formed on the optical disc 8.

When a ring-shaped opening which is a kind of a synthetic opening is used for the second filter 5, and no light source filter is used, an intensity distribution Io(x,y) of an image plane is represented by the equation (2), $$Io(x,y)=\iint O(u,v) \cdot D'(x-u, y-v) \, du \, dv \quad (2)$$

where O(u,v) is a function for an intensity distribution of the secondary light source, and D' (x−u, y−v) is an impulse response.

When a narrow ring-shaped opening is used for the second filter 5, the intensity distribution Io(x,y) is represented by the equation (3), $$Io(x,y)=Io(\eta)=A Jo^2(\eta) \quad (3)$$

where A is a constant, Jo is Bessel function of zero order and $Jo^2(\eta)$ is a function for an amplitude of a diffraction image.

At this time, a diffraction image of high order is observed.

When the light source filter 3 is used, and the intensity distribution of the second light source is changed to be O' (u,v), an image intensity distribution I' (x,y) is represented by the equation (4), $$I'(x,y)=\iint O'(u,v) \cdot D'(x-u, y-v) \, du \cdot dv \quad (4)$$

where O' (u,v) is a function for an intensity distribution of the secondary light source, and D' (x−u, y−v) is an impulse response.

For the structure in the first preferred embodiment, the image plane intensity distribution Io(x,y), at which a diffraction image of high order is observed, can be converted to an intensity distribution I' (x,y) of a disc having an ordinary circular opening as defined by the equation (5), $$I'(x,y)=I'(\eta)=B[J_1/\eta]^2 \quad (5)$$

where I' (η) is a function for an intensity distribution in a polar coordinates η, B is a constant and $B[J_1/\eta]$ is a function for an amplitude of a diffraction image.

When a function O' (u,v) for the light source 3 is set to keep a described intensity distribution I' (x,y), an optical system, in which the size of a light spot on the optical disc 8 can be smaller than the diffraction limitation, and sidelobes can be removed, is obtained.

A laser light which is reflected and modulated by the optical disc 8 is supplied to the objective lens 7, by which the laser light is collimated. The collimated light is splitted to two light paths by the beam splitter 10, and on of the splitted lights is supplied to the photoelectric converter 11, while the remaining one of the splitted lights is supplied via the cylindrical lens 12 generating astigmatism to the photoelectric converter 13. In the photoelectric converter 11, a tracking error is detected by push-pull method, and, in the photoelectric converter 13, a focusing error is detected in accordance with the astigmatism.

The light source filter 3 used in the first preferred embodiment will be explained in FIGS. 4A(a) and (b), to FIGS. 4E(a) and (b).

Figure 4A:
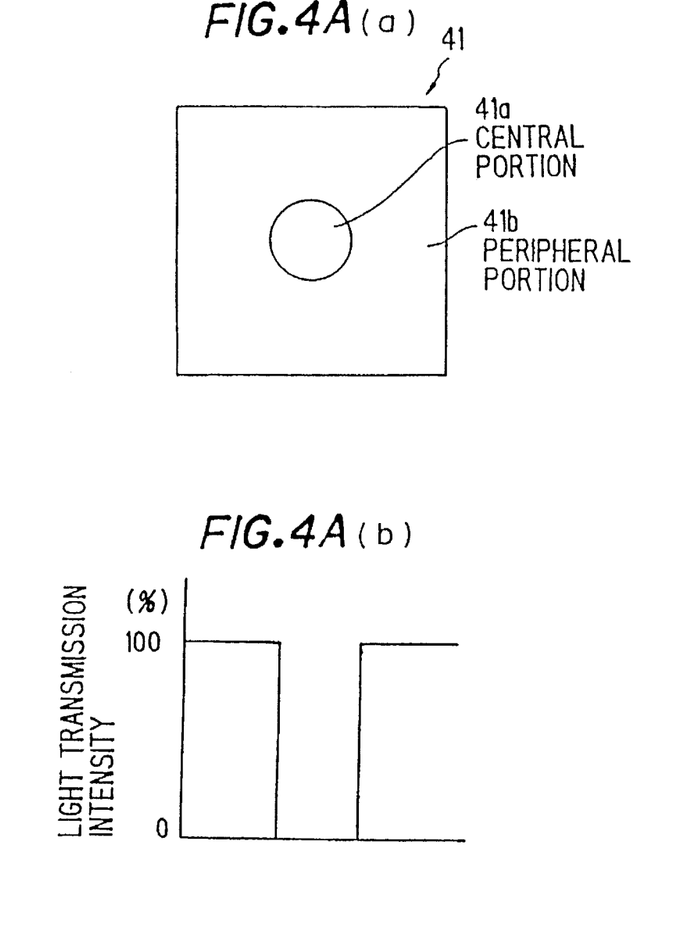
Figure 4B:
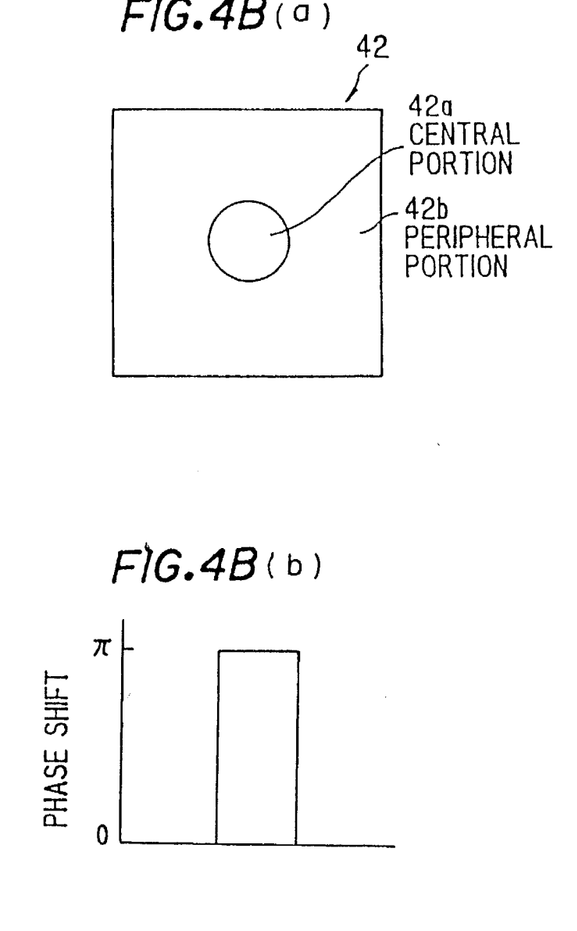
Figure 4C:
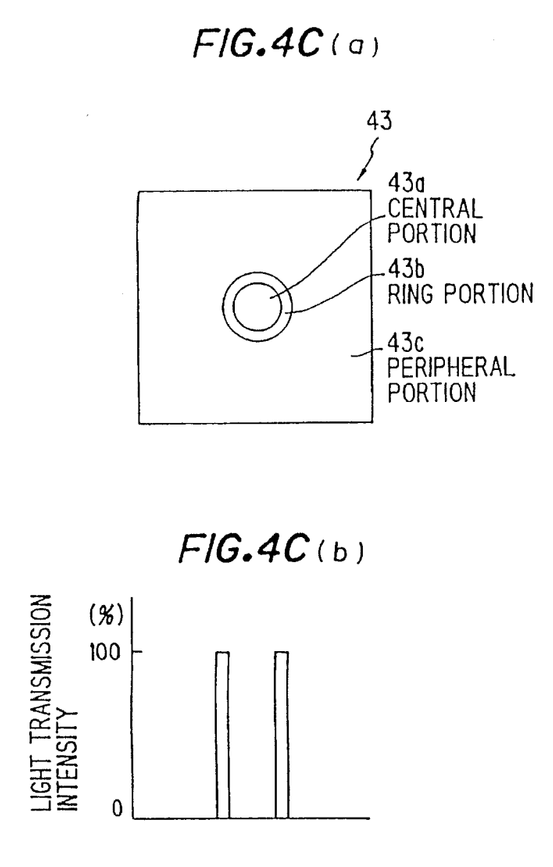
Figure 4D:
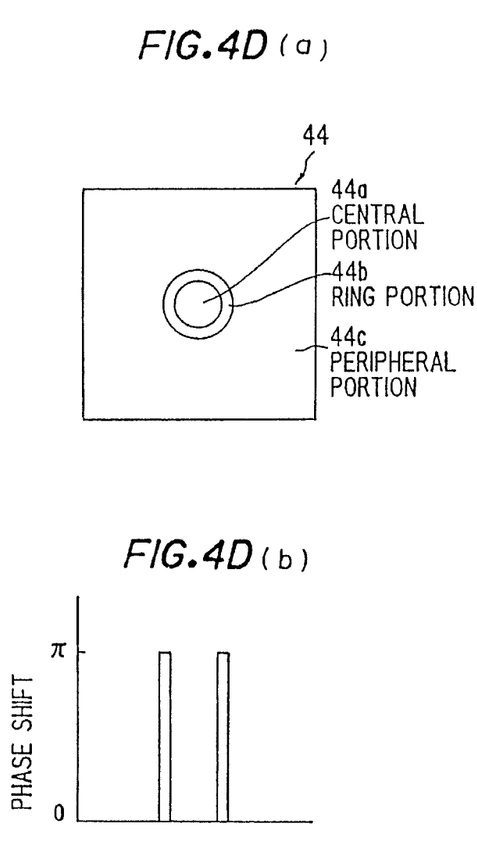
Figure 4E:
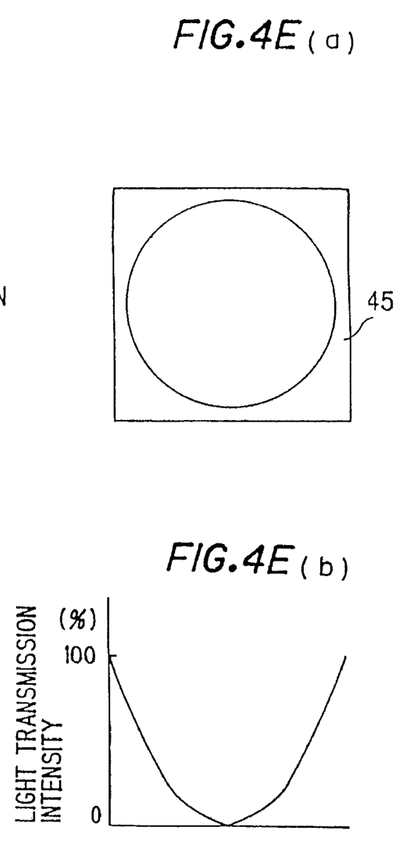

FIG. 4A(a) shows a light shielding filter 41 having a central portion 41a and a peripheral portion 41b, wherein the central portion 41a has a light transmission intensity of 0%, and the peripheral portion 41b has a light transmission intensity of 100%, respectively, as shown in FIG. 4A(b).

FIG. 4B(a) shows a phase shift filter 42 having a central portion 42a and a peripheral portion 42b, wherein the central portion 42a has a light transmission phase shift of π, and the peripheral portion 42b has a light transmission phase shift of 0, respectively, as shown in FIG. 4B(b).

FIG. 4C(a) shows a ring light shielding filter 43 having a central portion 43a, a ring portion 43b, and a peripheral portion 43c, wherein the central and peripheral portions 43a and 43c a light transmission intensity of 0%, and the ring portion 43b has a light transmission intensity of 100%, respectively, as shown in FIG. 4C(b).

FIG. 4D(a) shows a phase shift filter 44 having a central portion 44a, a ring portion 44b and a peripheral portion 44c, wherein the ring portion has a light transmission phase shift of π, and the central and peripheral portions 44a and 44c have a light transmission phase shift of 0, respectively, as shown in FIG. 4D(b).

FIG. 4E(a) shows an analog filter 45 having a graded light transmission intensity of 100% at an edge and of 0% at the central point as shown in FIG. 4E(b).

The second filter 5 used in the first preferred embodiment will be explained in FIGS. 5A(a) and (b) to FIGS. 5e(a) and (b).

Figure 5A:
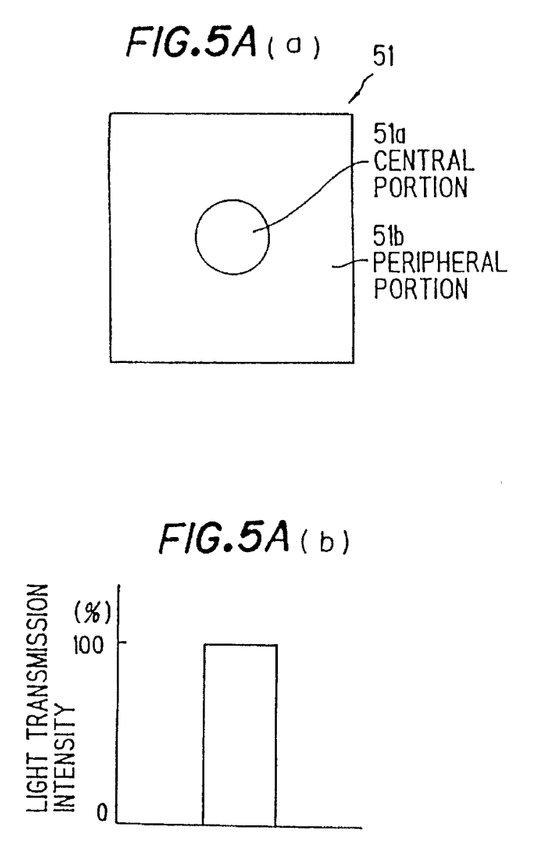
Figure 5B:
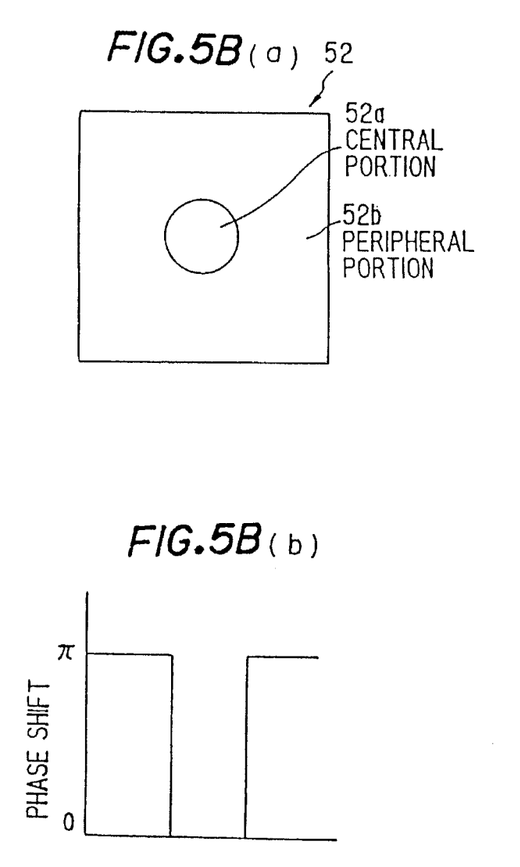
Figure 5C:
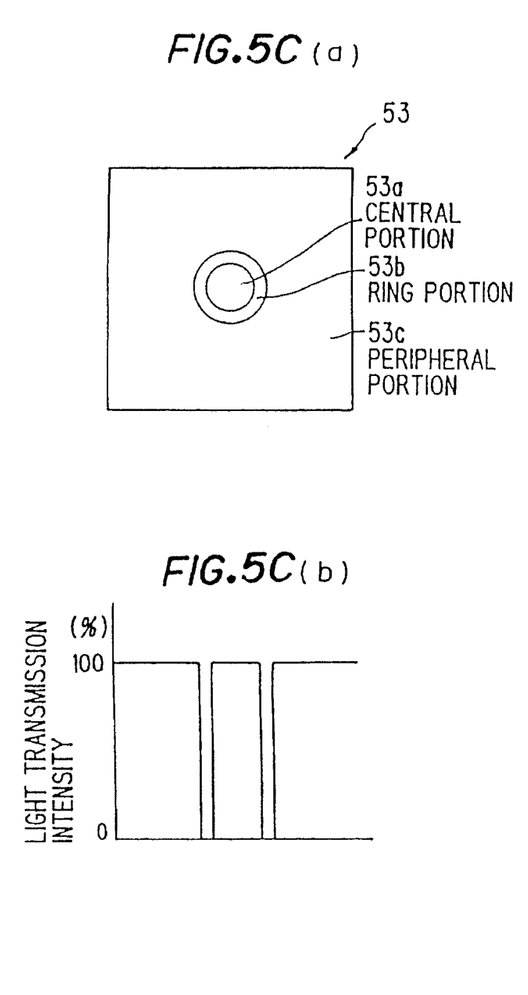
Figure 5D:
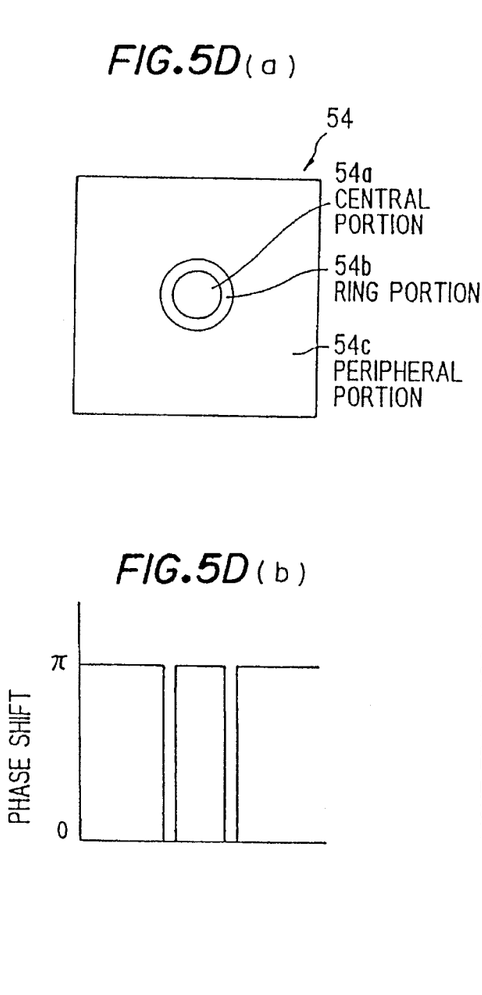
Figure 5E:
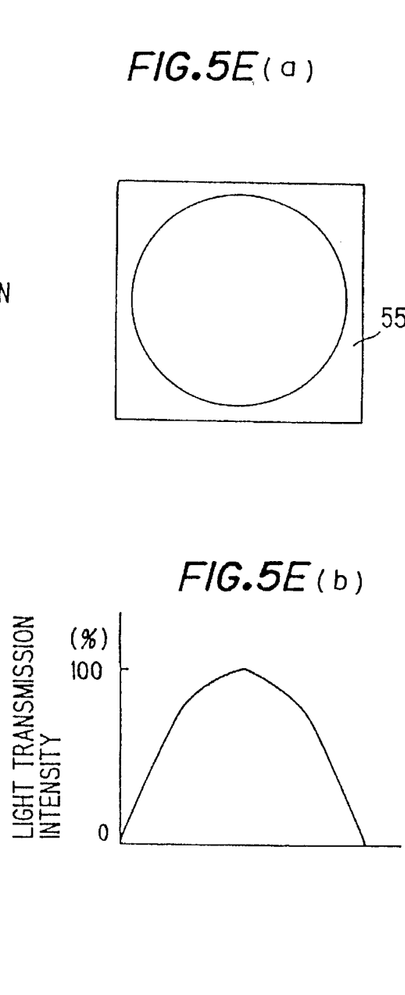

FIG. 5A(a) shows a light shielding filter 51 having a central portion 51a and a peripheral portion 51b, wherein the central portion 51a has a light transmission intensity of 100%, and the peripheral portion 51b has a light transmission intensity of 0%, respectively, as shown in FIG. 5A(b).

FIG. 5B(a) shows a phase shift filter 52 having a central portion 52a and a peripheral portion 52b, wherein the central portion 52a has a light transmission phase shift of 0, and the peripheral portion 52b has a light transmission phase shift of π, respectively, as shown in FIG. 5B(b).

FIG. 5C(a) shows a ring light shielding filter 53 having a central portion 53a, a ring portion 53b, and a peripheral portion 53c, wherein the central and peripheral portions 53a and 53c a light transmission intensity of 100%, and the ring portion 53b has a light transmission intensity of 0%, respectively, as shown in FIG. 5C(b).

FIG. 5D(a) shows a phase shift filter 54 having a central portion 54a, a ring portion 54b and a peripheral portion 54c, wherein the ring portion has a light transmission phase shift of 0, and the central and peripheral portions 54a and 54c have a light transmission phase shift of π, respectively, as shown in FIG. 5D(b).

FIG. 5E(a) shows an analog filter 55 having a graded light transmission intensity of 0% at an edge and of 100% at the central point as shown in FIG. 5E(b).

One of the light shielding filters 41, 43 and 45, or one of the phase shift filter 42 and 44 is selected for the light source filter 3, and one of the light shielding filters 51, 53 and 55, or one of the phase shift filter 52 and 54 is selected for second filter 5, so that 25(=5×5) combinations are obtained for the light source filter 3 and the second filter 5 in the first preferred embodiment.

On the other hand, one of the light shielding and phase shift filters 51 to 55 in FIGS. 5A(a) to 5E(a) is used for the light source filter 3, and one of the light shielding and phase shift filters 41 to 45 in FIGS. 4A(a) to 4E(a) is used for the second filter 5. Thus, further 25 combinations are obtained for the light source and second filters 3 and 5 in the first preferred embodiment.

In one example in the first preferred embodiment, it is assumed that the light source filter 3 is the light shielding filter 41, and the second filter 5 is the light shielding filter 51. In this case, only a peripheral portion of a light radiated from the semiconductor laser 1 is converted to a light source at a position of the light source filter 3. Consequently, a light spot on the optical disc 8 can be focused to be smaller in size than the diffraction limitation. On the other hand, a side-lobe intensity becomes large.

However, the side-lobes are reduced by the second filter 5 using the light shielding filter 51 having the light transmission intensity of 0% at the peripheral portion 51b.

For this reason, there is obtained an advantage in the first preferred embodiment in that the size of a light spot is kept to be smaller than the diffraction limitation, while the side-lobe intensity is removed.

In the first preferred embodiment, the filtering of a laser light radiated from the semiconductor laser 1 may be carried out on a semiconductor chip for the semiconductor laser 1. In such a case, the light source filter 1 is eliminated to make the optical head smaller in size.

Figure 6:
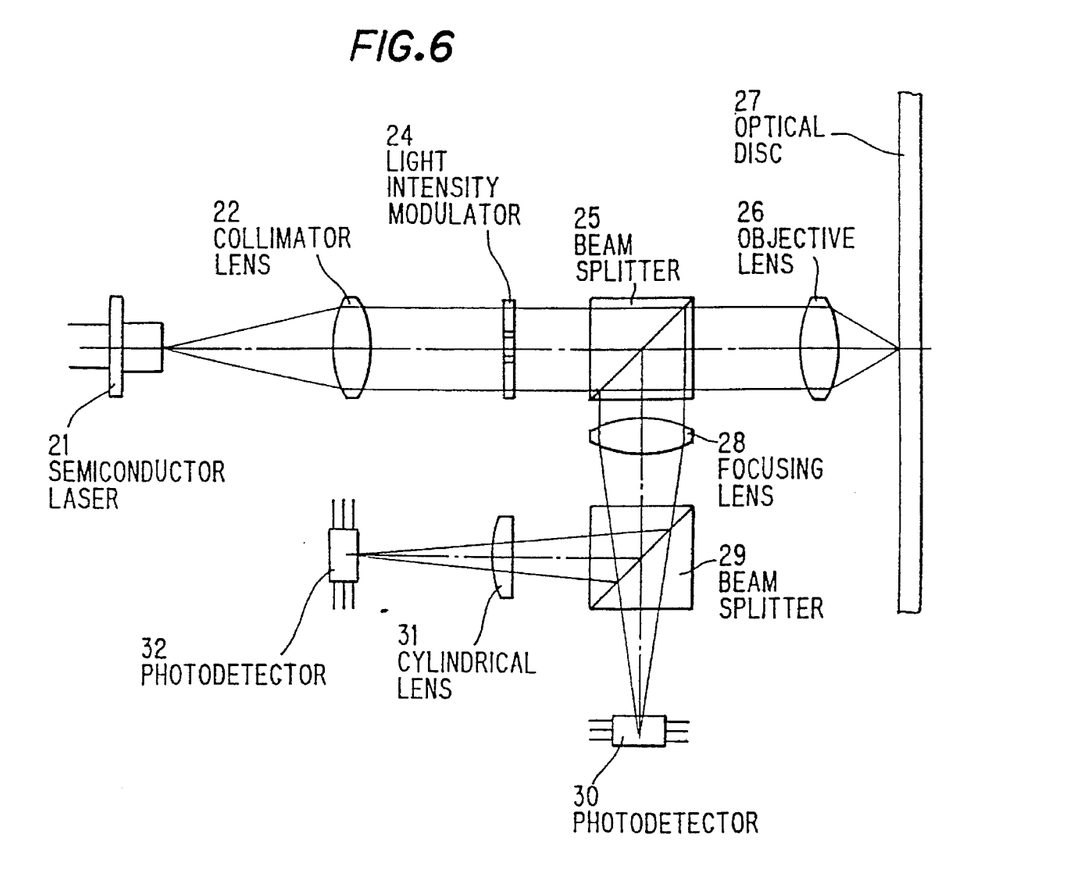
FIG. 6 is an explanatory diagrams showing an optical head in a second preferred embodiment according to the invention.

FIG. 6 shows an optical head in the second preferred embodiment according to the invention.

The optical head comprises a semiconductor laser 21, collimator lens 22, a light intensity modulator 24, a beam splitter 25, an objective lens 26, an optical disc 27, focusing lens 28, a beam splitter 29, a photoelectric converter 30, a cylindrical lens 31, and a photoelectric converter 32.

Figure 7A:
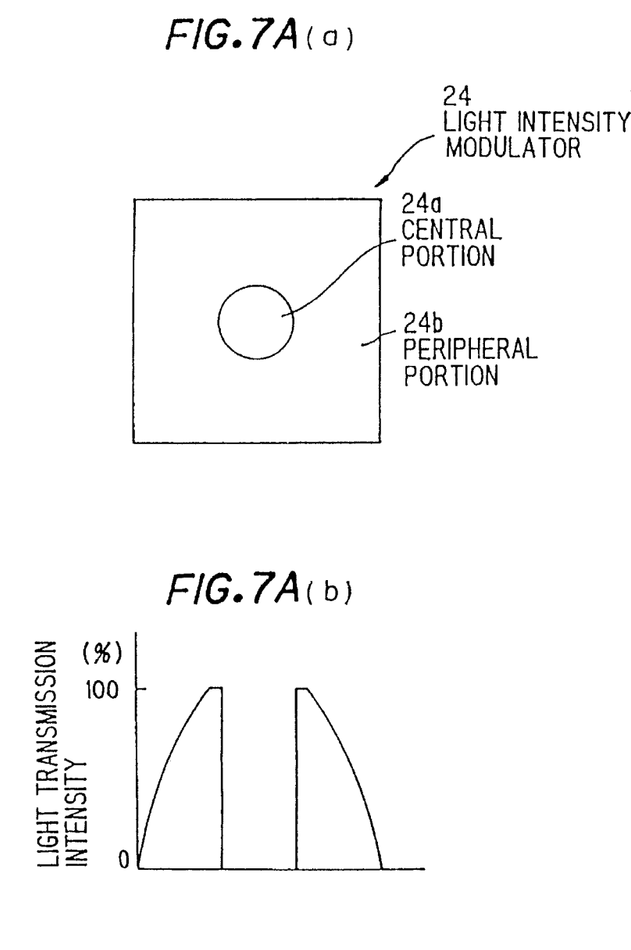
Figure 7B:
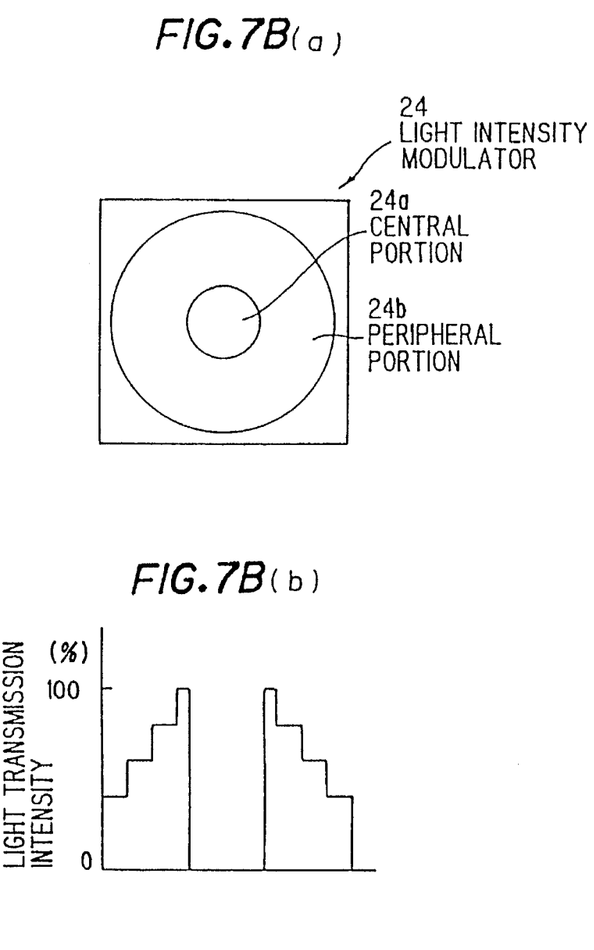
Figure 7C:
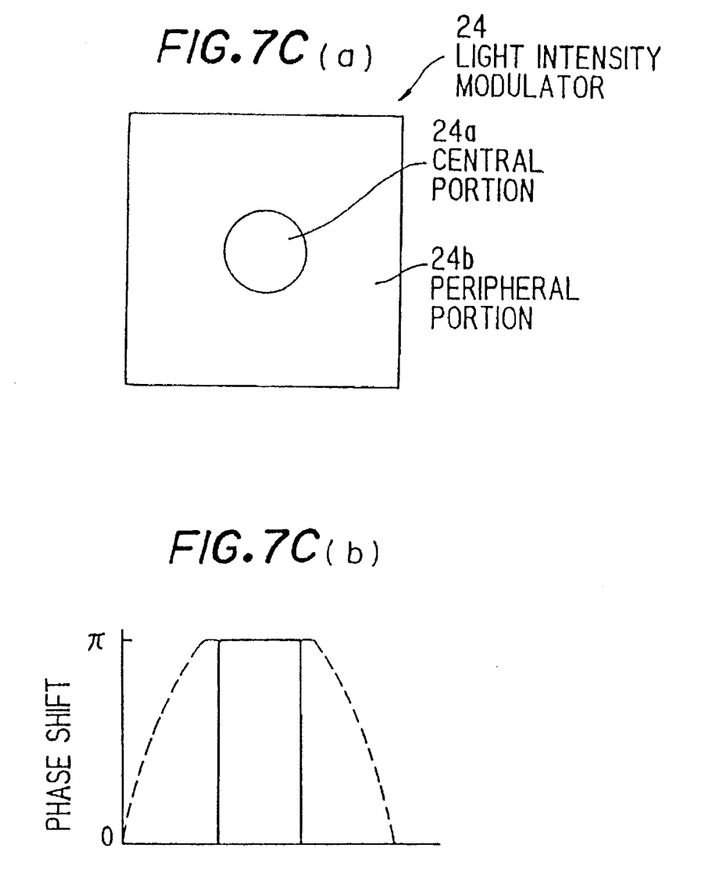
Figure 7D:
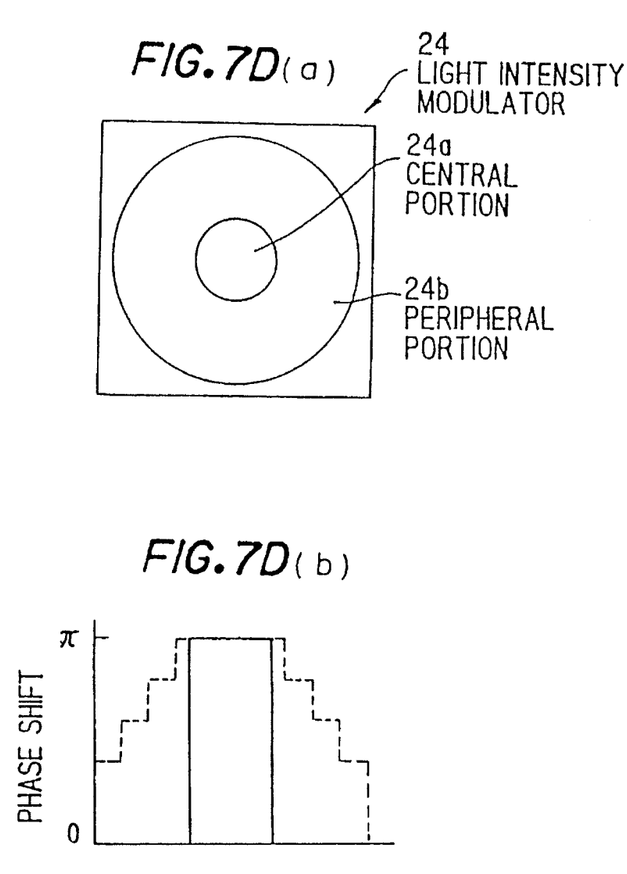

FIG. 7A(a) shows the light intensity modulator 24 comprising a central portion 24a having a light transmission intensity of 0% and a peripheral portion 24b having a graded light transmission intensity of 100% at a boundary between the central and peripheral portions 24a and 24b and of 0% at an edge.

In operation, a light radiated from the semiconductor laser 21 is collimated by the collimator lens 22, and a central portion of the collimated light is modulated by the light intensity modulator 24, as shown in FIGS. 7A(a) and (b). The intensity-modulated light is transmitted via the beam splitter 25 and focused to be a fine light spot on the optical disc 27 by the objective lens 26. In accordance with the intensity modulation of the collimated light by the light intensity modulator 24, the size of the focused light spot is made smaller than the diffraction limitation.

The light reflected on the optical disc 27 is splitted via the objective lens 26, the beam splitter 25, and the focusing lens 28 to two light paths by the beam splitter 29, and one of the splitted lights is supplied to the photoelectric converter 30, while the remaining one of the splitted lights is supplied via the cylindrical lens 31 to the photoelectric converter 32.

In the cylindrical lens 31, astigmatism is generated to detect a focusing error in the photoelectric converter 32. On the other hand, a tracking error is detected in the photoelectric converter 30 by push-pull method. Simultaneously, information is reproduced in the photoelectric converter 30. In the second preferred embodiment, the central portion of the radiated light is shielded to make the focused light spot smaller by the central portion 24a of the light intensity modulator 24, and the peripheral portion of the light spot is gradually shielded from the boundary between the central and peripheral portions in the graded configuration as shown in FIG. 7A(b) by the peripheral portion 24b of the light intensity modulator 24, so that no side-lobe is generated around a main light spot to enhance quality of the reproduced information by suppressing noise caused by cross-talk from adjacent pits on the optical disc 27.

The light intensity modulator 24 as shown in FIGS. 7A(a) and (b) may be replaced by light intensity modulators 24 as shown in FIGS. 7B(a) and (b) to FIGS. 7D(a) and (b), as explained below.

In FIG. 7B(a), the light intensity modulator 24 comprises a central portion 24a having a light transmission intensity of 0%, and a peripheral portion 24b having a light transmission intensity changing in a stepping manner, respectively, as shown in FIG. 7B(b).

In FIG. 7C(a), the light intensity modulator 24 comprises a central portion 24a having a phase shift of π (solid line), and peripheral portion 24b having a graded light transmission intensity decreasing in an outer peripheral direction (dotted line), respectively, as shown in FIG. 7C(b).

In FIG. 7D(a), the light intensity modulator 24 comprises a central portion 24a having a phase shift of π (solid line), and a peripheral portion 24b having a light transmission intensity changing in a stepping manner (dotted line), respectively, as shown in FIG. 7D(b).

Figure 8A:
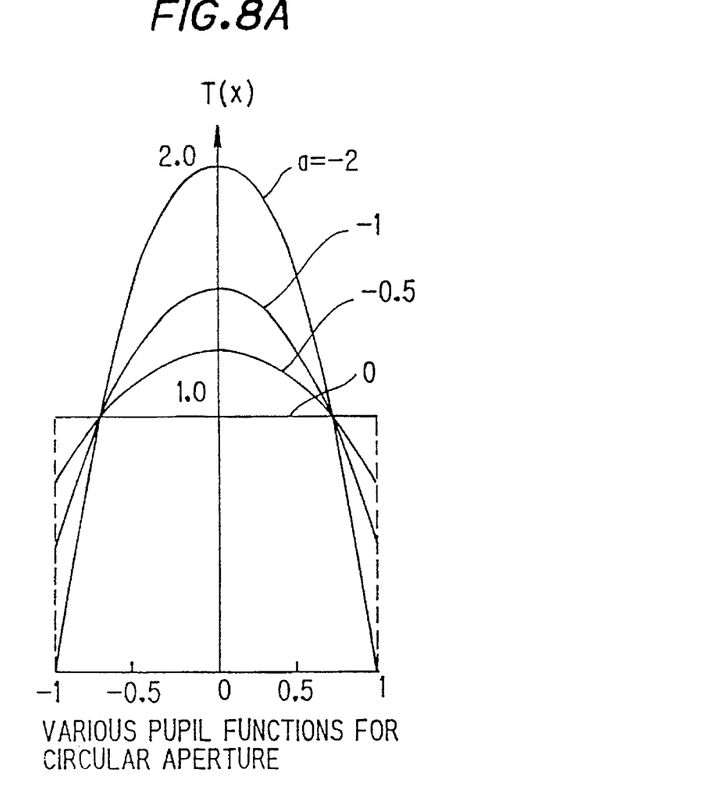
FIGS. 8A and 8B are explanatory diagrams showing calculation examples of the light intensity modulators used in the second preferred embodiment.
Figure 8B:
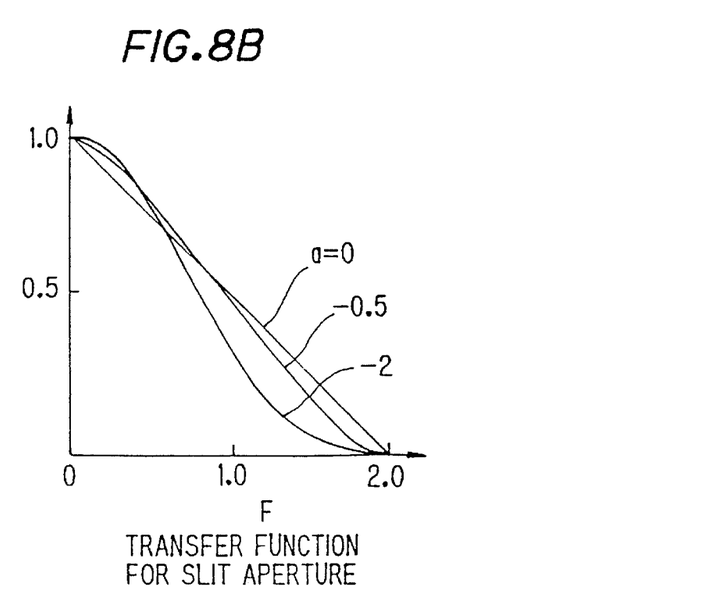

FIG. 8A shows an intensity distribution of an incident light beam for calculating a conversion constant of a light transmission intensity, and FIG. 8B shows that the size of a main spot becomes small, while side-lobes are eliminated.

In designing the light intensity modulator 24, a diameter of the central portion 24a is determined to provide a light spot of a predetermined diameter. In general, a side-lobe component becomes large, as a diameter of the light spot becomes small to be less than the diffraction limitation.

In FIG. 8A, a mean amplitude transmission factor T(X) of an aperture is defined by the equation (6), $$T(x)=ax^+(1-a/2) \qquad (6)$$

where a is a constant (−2<a<2), and x is a coordinate of a motion diameter of a circular aperture.

The optimum value of the constant a is determined to be −2 in consideration of an effective diameter of an incident light beam. However, when a desired light spot diameter is slightly smaller than the diffraction limitation, the constant a may be in a range of −2 to −0.5, because the side-lobe component is not large.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

what is claimed is:

1. An optical head, comprising:

a light source for providing a radiated light beam;

a collimator lens for collimating said radiated light beam to provide a collimated light;

an objective lens for focusing said collimated light to form a light spot on an optical disc;

a beam splitter for splitting a light beam reflected from said optical disc to first and second light beams;

means for converting said first and second light beams to first and second electric signals;

a light source filter for converting an intensity distribution of said radiated light beam to an intensity distribution of a disc having a circular aperture to provide an intensity distribution-converted light which is supplied to said collimator lens as said radiated light beam; and a second filter for converting an intensity distribution of said intensity distribution of said distribution-converted light dependently on said intensity distribution-converted light, said second filter being positioned at an output stage of said collimator.

2. An optical head, according to claim 1, wherein:

said light source is a semiconductor laser provided on a semiconductor chip; and said light source filter is provided on said semiconductor chip.

3. An optical head, according to claim 1, wherein: said light source filter is positioned between a condenser lens and said collimator lens, said condenser lens being provided on an output side of said light source.

4. An optical head, according to claim 1, wherein:

said light source filter provides an intensity distribution O' (u,v) for suppressing a change of side-lobes of an image, and has a property in which an image plane intensity distribution I' (x,y) of light including information reproduced from said optical disc is represented by the equation, $$I'(x,y)=\iint O'(u,v)\cdot D'(x-u, y-v)du\cdot dv$$

where D' (x-u, y-v) is an impulse response.

5. An optical head, comprising:

a light source for providing a radiated light beam;

a collimator lens for collimating said radiated light beam to provide a collimated light;

an objective lens for focusing said collimated light to form a light spot on an optical disc;

a beam splitter for splitting a light beam reflected from said optical disc to first and second light beams;

means for converting said first and second light beams to first and second electric signals; and a light intensity modulator for reducing a diameter of said light spot and suppressing side-lobes generated around said light spot, said light intensity modulator being positioned between said collimator lens and said objective lens.

6. An optical head, according to claim 5, wherein:

said light intensity modulator, comprises:

a central portion having a light transmission intensity of 0%; and a peripheral portion having a light transmission intensity decreasing in an outer peripheral direction.

7. An optical head, according to claim 5, wherein:

said light intensity modulator, comprises:

a central portion having a phase shift of π; and a peripheral portion having a light transmission intensity decreasing in an outer peripheral direction.

8. An optical head, comprising:

a light source for providing a radiated light beam;

a collimator lens for collimating said radiated light beam to provide a collimated light;

an objective lens for focusing said collimated light to form a light spot on an optical disc;

a beam splitter for splitting a light beam reflected from said optical disc to first and second light beams;

photoelectric converters to convert said first and second light beams to first and second electric signals;

a light source filter for converting an intensity distribution of said radiated light beam to an intensity distribution of a disc having a circular aperture to provide an intensity distribution-converted light which is supplied to said collimator lens as said radiated light beam; and a second filter for converting an intensity distribution of said intensity distribution of said distribution-converted light dependently on said intensity distribution-converted light, said second filter being positioned at an output stage of said collimator.

9. An optical head, comprising:

a light source for providing a radiated light beam;

a collimator lens for collimating said radiated light beam to provide a collimated light;

an objective lens for focusing said collimated light to form a light spot on an optical disc;

a beam splitter for splitting a light beam reflected from said optical disc to first and second light beams;

photoelectric converters to convert said first and second light beams to first and second electric signals; and a light intensity modulator for reducing a diameter of said light spot and suppressing side-lobes generated around said light spot, said light intensity modulator being positioned between said collimator lens and said objective lens.

* * * * *